United States Patent
Zhang et al.

(10) Patent No.: US 10,820,015 B2
(45) Date of Patent: Oct. 27, 2020

(54) METHOD AND APPARATUS FOR INTRA PREDICTION CODING WITH BOUNDARY FILTERING CONTROL

(71) Applicant: HFI Innovation Inc., Zhubei, Hsinchu County (TW)

(72) Inventors: Xianguo Zhang, Beijing (CN); Jian-Liang Lin, Su'ao Township, Yilan County (TW); Kai Zhang, Beijing (CN); Jicheng An, Beijing (CN); Han Huang, Beijing (CN); Yi-Wen Chen, Taichung (TW)

(73) Assignee: HFI Innovation Inc., Zhubei, Hsinchu County (TW)

( * ) Notice: Subject to any disclaimer, the term of this patent is extended or adjusted under 35 U.S.C. 154(b) by 188 days.

(21) Appl. No.: 15/108,878

(22) PCT Filed: Dec. 31, 2014

(86) PCT No.: PCT/CN2014/095901
§ 371 (c)(1),
(2) Date: Jun. 29, 2016

(87) PCT Pub. No.: WO2015/101329
PCT Pub. Date: Jul. 9, 2015

(65) Prior Publication Data
US 2016/0330481 A1   Nov. 10, 2016

Related U.S. Application Data

(63) Continuation-in-part of application No. PCT/CN2014/072491, filed on Feb. 25, 2014.
(Continued)

(51) Int. Cl.
*H04N 19/597* (2014.01)
*H04N 19/117* (2014.01)
(Continued)

(52) U.S. Cl.
CPC ......... *H04N 19/597* (2014.11); *H04N 19/117* (2014.11); *H04N 19/159* (2014.11);
(Continued)

(58) Field of Classification Search
CPC .... H04N 19/597; H04N 19/96; H04N 19/172; H04N 19/182; H04N 19/86; H04N 19/70;
(Continued)

(56) References Cited

U.S. PATENT DOCUMENTS 9,596,461 B2 * 3/2017 Chong ................. H04N 19/159
2011/0274158 A1 * 11/2011 Fu ........................ H04N 19/176
375/240.02
(Continued)

FOREIGN PATENT DOCUMENTS

CN    103238318 A    8/2013
CN    103404147 A    11/2013
(Continued)

OTHER PUBLICATIONS

Chen et al. "Non-RCE2: Enhanced angular intra prediction for screen content coding", Joint Collaborative Team on Video Coding (JCT-VC) of ITU-T SG 16 WP 3 and ISO/IEC JTC 1/SC 29/WG 11, 14th Meeting: Vienna, Austria, Jul. 25-Aug. 2, 2013.*
(Continued)

*Primary Examiner* — Richard A Hansell, Jr.
(74) *Attorney, Agent, or Firm* — Oblon, McClelland, Maier & Neustadt, L.L.P.

(57) ABSTRACT

A method and apparatus for Intra prediction coding in multi-view video coding, three-dimensional video coding, or screen content video coding are disclosed. A first filtering-disable-flag associated with a high-level video data is determined to indicate whether to disable at least one filter from a filter group. If the first filtering-disable-flag is asserted, one or more selected Intra prediction modes from an Intra
(Continued)

prediction mode group is determined, and at least one filter from the filter group for the current block is skipped if the current Intra prediction mode of the current block belongs to the selected Intra prediction modes. The system may further determine a second filtering-disable-flag associated with a low-level video data corresponding to a current block level or a higher level than the current block level to disable said at least one filter from a filter group for the low-level video data.

20 Claims, 4 Drawing Sheets

Related U.S. Application Data

(60) Provisional application No. 61/922,904, filed on Jan. 2, 2014.

(51) Int. Cl.
| | |
|---|---|
| *H04N 19/159* | (2014.01) |
| *H04N 19/176* | (2014.01) |
| *H04N 19/70* | (2014.01) |
| *H04N 19/86* | (2014.01) |
| *H04N 19/172* | (2014.01) |
| *H04N 19/182* | (2014.01) |
| *H04N 19/96* | (2014.01) |

(52) U.S. Cl.
CPC ......... *H04N 19/172* (2014.11); *H04N 19/176* (2014.11); *H04N 19/182* (2014.11); *H04N 19/70* (2014.11); *H04N 19/86* (2014.11); *H04N 19/96* (2014.11)

(58) Field of Classification Search
CPC ... H04N 19/176; H04N 19/159; H04N 19/117
See application file for complete search history.

(56) References Cited

U.S. PATENT DOCUMENTS

| | | | | |
|---|---|---|---|---|
| 2012/0082224 A1* | 4/2012 | Van Der Auwera | ... | H04N 19/85 375/240.12 |
| 2012/0320974 A1 | 12/2012 | Li et al. | | |
| 2013/0022113 A1 | 1/2013 | Chen et al. | | |
| 2013/0101025 A1 | 4/2013 | Van der Auwera et al. | | |
| 2013/0114708 A1* | 5/2013 | Van der Auwera | ......................... | H04N 19/593 375/240.12 |
| 2014/0205000 A1 | 7/2014 | Lee et al. | | |
| 2015/0023405 A1* | 1/2015 | Joshi | .................... | H04N 19/593 375/240.02 |
| 2015/0264348 A1* | 9/2015 | Zou | ....................... | H04N 19/593 375/240.02 |
| 2015/0341636 A1* | 11/2015 | Tsai | ..................... | H04N 19/593 375/240.02 |
| 2016/0057430 A1* | 2/2016 | Kolesnikov | .......... | H04N 19/176 375/240.12 |

FOREIGN PATENT DOCUMENTS

| | | | | |
|---|---|---|---|---|
| CN | 103404151 | 11/2013 | | |
| WO | WO 2011/140960 | 11/2011 | | |
| WO | WO 2013189205 A1 * | 12/2013 | ........... | H04N 19/597 |
| WO | WO-2013189205 A1 * | 12/2013 | ........... | H04N 19/136 |

OTHER PUBLICATIONS

Chen et al. "Non-RCE2: Enhanced angular intra prediction for screen content coding", Joint Collaborative Team on Video Coding (JCT-VC) of ITU-T SG 16 WP 3 and ISO/IEC JTC 1/SC 29/WG 11, 14th Meeting: Vienna, Austria, Jul. 25-Aug. 2, 2013 (Year: 2013).*

Kim, I.K., et al.; "High Efficiency Video Coding (HEVC) Test Model 10 (HM10) Encoder Description;" Joint Collaborative Team on Video Coding (JCT-VC) of ITU-T SG16 and WP3 and ISO/IEC JTC1/SC29/WG11; Jan. 2013; pp. 1-38.

International Search Report dated Mar. 27, 2015, issued in application No. PCT/CN2014/095901.

Kim, I.K., et al.; "HM9: High Efficiency Video Coding (HEVC) Test Model 9 Encoder Description;" International Organisation for Standardisation; ISO/IEC JTC1/SC/29/WG11; Oct. 2012; pp. 1-36.

Zhang, R., et al.; "3D-AVC-CE10 on Depth In-loop Filtering by Qualcomm;" International Organisation for Standardisation; Feb. 2012; pp. 1-13.

Indian Office Action dated Sep. 16,2019 in Patent Application No. 201627025684 (with English translation), 5 pages.

* cited by examiner

Z' =(G+2Z+A+2)>>2
A' =(Z+2A+B+2)>>2
B' =(A+2B+C+2)>>2
C' =(B+2C+D+2)>>2
...

0 : Intra_Planar
1 : Intra_DC

METHOD AND APPARATUS FOR INTRA PREDICTION CODING WITH BOUNDARY FILTERING CONTROL

CROSS REFERENCE TO RELATED APPLICATIONS

The present invention claims priority to U.S. Provisional Patent Application, Ser. No. 61/922,904, filed on Jan. 2, 2014 and is a Continuation-In-Part of PCT Patent Application Serial No. PCT/CN2014/072491, filed on Feb. 25, 2014. The U.S. Provisional Patent Application and the PCT patent Application are hereby incorporated by reference in their entireties.

FIELD OF THE INVENTION

The present invention relates Intra prediction coding for multi-view video coding, three-dimensional video coding, and screen content video coding. In particular, the present invention relates to techniques of boundary filtering control to selectively disable boundary filtering and/or neighboring sample filtering for certain Intra prediction modes under certain conditions.

BACKGROUND AND RELATED ART

Three-dimensional (3D) television has been a technology trend in recent years that intends to bring viewers sensational viewing experience. Various technologies have been developed to enable 3D viewing. Among them, the multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism.

The multi-view video is typically created by capturing a scene using multiple cameras simultaneously, where the multiple cameras are properly located so that each camera captures the scene from one viewpoint. Accordingly, the multiple cameras will capture multiple video sequences corresponding to multiple views. In order to provide more views, more cameras have been used to generate multi-view video with a large number of video sequences associated with the views. Accordingly, the multi-view video will require a large storage space to store and/or a high bandwidth to transmit. Therefore, multi-view video coding techniques have been developed in the field to reduce the required storage space or the transmission bandwidth.

A straightforward approach may be to simply apply conventional video coding techniques to each single-view video sequence independently and disregard any correlation among different views. Such coding system would be very inefficient. In order to improve efficiency of multi-view video coding, typical multi-view video coding exploits inter-view redundancy. Therefore, most 3D Video Coding (3DVC) systems take into account of the correlation of video data associated with multiple views and depth maps. The standard development body, the Joint Video Team of the ITU-T Video Coding Experts Group (VCEG) and the ISO/IEC Moving Picture Experts Group (MPEG), extended H.264/MPEG-4 AVC to multi-view video coding (MVC) for stereo and multi-view videos.

In the reference software for HEVC based 3D video coding (3D-HEVC), 3D-HTM, the basic unit for compression, termed as coding unit (CU), is a 2N×2N square block. Each CU can be recursively split into four smaller CUs until a predefined minimum size is reached. Each CU contains one or more prediction units (PUs).

Boundary Filtering for DC, Vertical and Horizontal Prediction Modes

The Intra prediction adopted by HEVC and HEVC-SCC Extension (HEVC Screen Content Coding Extension) include DC mode, Horizontal mode, vertical mode and various angular prediction modes. In the DC mode, the whole block is predicted by a single prediction corresponding to a uniform field. Accordingly such mode is called direct current (DC) mode in the field. For DC mode in the HEVC-based video coding standard including 3D-HEVC, a boundary filter (or smoothing filter) is applied to blocks coded in the DC mode. The boundary prediction samples of DC mode will be smoothed with a [1, 3] or [1, 2, 1] filter to reduce the block artifact as shown in FIG. 1A, where [1, 3] and [1, 2, 1] refer to filter weightings or filter coefficients. When a block boundary pixel is located at the edge of the block boundary, filter [1, 3] as shown in FIG. 1B is applied to the edge boundary pixel. As shown in FIG. 1A, an edge pixel may be adjacent to a horizontal boundary or a vertical boundary. If the boundary pixel is a corner pixel, filter [1, 2, 1] as shown in FIG. 1C is applied to the corner boundary pixel. As is known in the field, these filter weightings or filter coefficients can be scaled to have the same filtering effect except for different output scale. In other words, [1/4, 3/4] will have the same filtering effect as [1, 3]. And [1/4, 1/2, 1/4] will have the same effect as [1, 2, 1]. In the existing standard, the Intra-prediction Boundary Filtering (IBF) is always enabled.

The block boundary filter operations for the DC block are shown below. Depending on the color component index (i.e., cIdx), the following applies.

If cIdx is equal to 0 and nT is less than 32, the following applies.

$$\text{predSamples}[0][0]=(p[-1][0]+2*dcVal+p[0][-1]+2)>>2, \qquad (1)$$

$$\text{predSamples}[x][0]=(p[x][-1]+3*dcVal+2)>>2, \text{ with } x=1\ldots nT-1, \qquad (2)$$

$$\text{predSamples}[0][y]=(p[-1][y]+3*dcVal+2)>>2, \text{ with } y=1\ldots nT-1, \qquad (3)$$

$$\text{predSamples}[x][y]=dcVal, \text{ with } x,y=1\ldots nT-1. \qquad (4)$$

Otherwise, the prediction samples predSamples[x][y] are derived as, $$\text{predSamples}[x][y]=dcVal, \text{ with } x,y=0\ldots nT-1. \qquad (5)$$

For Vertical and Horizontal Intra prediction modes, a gradient based boundary filter is applied. FIG. 2 illustrates an example of the gradient based boundary smoothing filter for Horizontal Intra prediction direction. In the existing standard, the Vertical and Horizontal Intra prediction boundary filters can be disabled in the lossless coding mode. When both flag implicit_rdpcm_enabled_flag and flag cu_transquant_bypass_flag are asserted, the gradient filters are disabled. Flag implicit_rdpcm_enabled_flag indicates whether residual DPCM (differential pulse coded modulation) mode is enabled. Flag cu_transquant_bypass_flag indicates whether transform/quantization is bypassed for the CU. When a lossy coding mode is selected, no control mechanism is provided and the gradient filters are always enabled The block boundary filter operations for the Vertical and Horizontal modes are shown in the following:

When predModeIntra is equal to 26 (vertical), cIdx is equal to 0 and nT is less than 32, the following filtering applies with x=0, y=0 . . . nT−1.

$$predSamples[x][y]=Clip1_Y(p[x][-1]+((p[-1][y]-p[-1][-1])>>1)) \quad (6)$$

When predModeIntra is equal to 10 (horizontal), cIdx is equal to 0 and nT is less than 32, the following filtering applies with x=0 . . . nT−1, y=0.

$$predSamples[x][y]=Clip1_Y(p[-1][y]+((p[x][-1]-p[-1][-1])>>1)) \quad (7)$$

Neighboring Sample Filtering

For the luma component, the neighbouring samples used for Intra prediction sample generations are filtered before the generation process. The filtering is controlled by the given Intra prediction mode and transform block size as shown in FIG. 3A and FIG. 3B. If the Intra prediction mode is DC or the transform block size is equal to 4×4, neighbouring samples are not filtered. If the distance between the given Intra prediction mode and vertical mode (or horizontal mode) is larger than a predefined threshold, the filtering process is enabled. A correspondence between Intra prediction direction and the mode number is shown in FIG. 4. The predefined threshold is specified in Table 1, where nT represents the transform block size. FIG. 3A illustrates the samples to be processed by neighboring sample filtering for various block sizes. FIG. 3B illustrates the neighboring sample filtering process, where samples Z', A', B' and C' represent filtered samples corresponding neighboring samples Z, A, B and C.

TABLE 1

|  | nT = 8 | nT = 16 | nT = 32 |
|---|---|---|---|
| Threshold | 7 | 1 | 0 |

For neighboring sample filtering, [1, 2, 1] filter and bi-linear filter are used. The bi-linear filtering is conditionally used if all of the following conditions are true.
  strong_intra_smoothing_enable_flag is equal to 1
  transform block size is equal to 32
  Abs(p[−1][−1]+p[nT*2−1][−1]−2*p[nT−1][−1])<(1<<(BitDepthY−5))
  Abs(p[−1][−1]+p[−1][nT*2−1]−2*p[−1][nT−1])<(1<<(BitDepthY−5))

Filtering Process of Neighbouring Samples

Inputs to this process are:
  neighbouring samples p[x][y], with x=−1, y=−1 . . . nT*2−1 and x=0 . . . nT*2−1, y=−1,
  a variable nT specifying the transform block size.

Output of this process are:
  filtered samples pF[x][y], with x=−1, y=−1 . . . nT*2−1 and x=0 . . . nT*2−1, y=−1.

The variable filterFlag is derived as follows.
  If one or more of the following conditions are true, filterFlag is set equal to 0
  predModeIntra is equal to Intra_DC
  nT is equal 4
  Otherwise, the following applies.
  The variable minDistVerHor is set equal to Min(Abs(predModeIntra−26), Abs(predModeIntra−10)).
  The variable intraHorVerDistThres[nT] is specified in Table 1.

The variable filterFlag is derived as follows.
  If minDistVerHor is larger than intraHorVerDistThres[nT], filterFlag is set equal to 1,
  Otherwise, filterFlag is set equal to 0.

When filterFlag is equal to 1, the variable biIntFlag is derived as follows.
  If all of the following conditions are true, biIntFlag is set equal to 1
  strong_intra_smoothing_enable_flag is equal to 1
  nT is equal to 32
  Abs(p[−1][−1]+p[nT*2−1][−1]−2*p[nT−1][−1])<(1<<(BitDepthY−5))
  Abs(p[−1][−1]+p[−1][nT*2−1]−2*p[−1][nT−1])<(1<<(BitDepthY−5))
  Otherwise, biIntFlag is set equal to 0.

When filterFlag is equal to 1, the filtering is performed as follows.
  If biIntFlag is equal to 1, the filtered sample values pF[x][y] with x=−1, y=−1 . . . 63 and x=0 . . . 63, y=−1 are derived as follows.

$$pF[-1][63]=p[-1][63] \quad (8)$$

$$pF[63][-1]=p[63][-1] \quad (9)$$

$$pF[-1][y]=((63-y)*p[-1][-1]+(y+1)*p[-1][63]+32)>>6, \text{ for } y=0 \ldots 62 \quad (10)$$

$$pF[-1][-1]=p[-1][-1] \quad (11)$$

$$pF[x][-1]=((63-x)*p[-1][-1]+(x+1)*p[63][-1]+32)>>6, \text{ for } x=0 \ldots 62 \quad (12)$$

Otherwise (biIntFlag is equal to 0), the filtered sample values pF[x][y] with x=−1, y=−1 . . . nT*2−1 and x=0 . . . nT*2−1, y=−1 are derived as follows.

$$pF[-1][nT*2-1]=p[-1][nT*2-1] \quad (13)$$

$$pF[nT*2-1][-1]=p[nT*2-1][-1] \quad (14)$$

$$pF[-1][y]=(p[-1][y+1]+2*p[-1][y]+p[-1][y-1]+2)>>2, \text{ for } y=nT*2-2 \ldots 0 \quad (15)$$

$$pF[-1][-1]=(p[-1][0]+2*p[-1][-1]+p[0][-1]+2)>>2 \quad (16)$$

$$pF[x][-1]=(p[x-1][-1]+2*p[x][-1]+p[x+1][-1]+2)>>2, \text{ for } x=0 \ldots nT*2-2 \quad (17)$$

Interpolation Filter

Interpolation filter is yet another filter related to boundary filtering. In Intra prediction, there are multiple directional Intra prediction candidates. The relationship between variable intraPredAngle and the corresponding direction index is shown in FIG. 4 and Table 2. Each Intra direction predicts the sample at position (x, y) of one Prediction Unit (PU) by ((32−iFact)×ref[x+iIdx+1]+iFact×ref[x+iIdx+2]+16)>>5, when the direction is relatively vertical (the direction index corresponding to the direction intraPredAngle is greater than or equal to 18). In this expression, the array ref[ ] is the decoded line buffer above the current PU, idx is the floor position of the pixel in ref which (x, y) points to along the Intra direction (i.e., idx=((y+1)×intraPredAngle)>>5), and iFact is the distance between the floor position and pointed position (i.e., iFact=((y+1)×intraPredAngle)&31).

TABLE 2

| | predModeIntra | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| intraPredAngle | — | 32 | 26 | 21 | 17 | 13 | 9 | 5 | 2 | 0 | −2 | −5 | −9 | −13 | −17 | −21 | −26 |
| | predModeIntra | | | | | | | | | | | | | | | | |
| | 18 | 19 | 20 | 21 | 22 | 23 | 24 | 25 | 26 | 27 | 28 | 29 | 30 | 31 | 32 | 33 | 34 |
| intraPredAngle | −32 | −26 | −21 | −17 | −13 | −9 | −5 | −2 | 0 | 2 | 5 | 9 | 13 | 17 | 21 | 26 | 32 |

Similar Intra prediction process is applicable when the intra prediction direction is relatively horizontal (the direction index corresponding to variable intraPredAngle is smaller than 18). In that case, idx=((x+1)×intraPredAngle)>>5 and iFact=((x+1)×intraPredAngle)&31.

The above block boundary filter works under one assumption that the PU border is smooth. Therefore, a sharp transition between block boundaries and inside the block will be considered as an artifact and will be smoothed using boundary filtering and neighboring sample filtering. However, for the depth video in 3D applications and screen content video materials, the smoothness assumption may not be valid and the boundary filtering and neighboring sample filtering may even degrade the image quality. Therefore, it is desirable to provide a solution to overcome this possible quality degradation due to boundary filtering and neighboring sample filtering.

BRIEF SUMMARY OF THE INVENTION

A method and apparatus for Intra prediction coding in multi-view video coding, three-dimensional video coding, or screen content video coding according to the present invention are disclosed. A first filtering-disable-flag associated with a high-level video data is determined to indicate whether to disable at least one filter from a filter group. If the first filtering-disable-flag is asserted, one or more selected Intra prediction modes from an Intra prediction mode group is determined, and at least one filter from the filter group for the current block is skipped if the current Intra prediction mode of the current block belongs to the selected Intra prediction modes. The system may further determine a second filtering-disable-flag associated with a low-level video data corresponding to a current block level or a higher level than the current block level to disable said at least one filter from a filter group for the low-level video data. The high-level video data may correspond to a sequence level, a picture level, or a tile level, and the low-level video data corresponds to a slice level, a coding tree unit (CTU) level, a coding unit (CU) level or a prediction unit (PU) level. The second filtering-disable-flag can be determined depending on current block size.

The system may further apply said at least one filter from the filter group to the current block if the current Intra prediction mode does not belong to said one or more selected Intra prediction modes. The current block may correspond to a prediction unit (PU) or a coding unit (CU). The selected Intra prediction modes from the Intra prediction mode group may correspond to DC prediction mode, Horizontal prediction mode, vertical prediction mode, or any combination of these modes. Said at least one filter from the filter group may include Intra Boundary Filter, which is applied to boundary pixels of the current block using current reconstructed samples and neighboring reconstructed samples of the current block. Said at least one filter from the filter group further may further include Neighboring Sample Filter, which is applied to the neighboring reconstructed samples of the current block.

The first filtering-disable-flag can be asserted if the input data is the depth data for multi-view video coding or three-dimensional video coding, or screen content data for the screen content video coding. The first filtering-disable-flag can be asserted for the input data corresponds to the texture data in a dependent view in multi-view video coding or three-dimensional video coding. On the other hand, the first filtering-disable-flag can be dis-asserted if the input data corresponds to the texture data in an independent view or a base view. Filtering for DC prediction mode, Horizontal prediction mode, Vertical prediction mode, or a combination thereof can be disabled if the input data is the depth data or the screen content data. The first filtering-disable-flag can be signaled or parsed explicitly. The first filtering-disable-flag may also be determined implicitly, for example, according to decoding information such as whether the current block's CBF (coding bit flag) is 0, which signalizes there is no coding residual for the current block. Said at least one filter from the filter group can be predefined at a transform unit (TU) level, prediction unit (PU) level, coding unit (CU) level, largest coding unit (LCU) level, coding tree unit (CTU) level, coding tree block (CTB) level, slice level, slice header, picture level, picture parameter set (PPS), sequence parameter set (SPS) or video parameter set (VPS).

DETAILED DESCRIPTION OF THE INVENTION

Figure 1A:
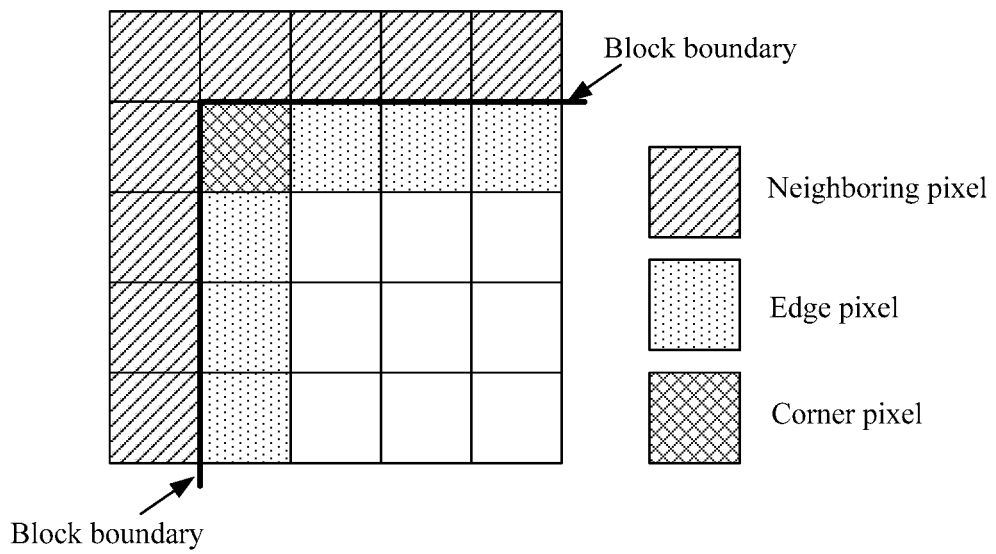
FIG. 1A illustrates an example of boundary pixels and neighboring pixels of an Intra predicted block to be processed by boundary filtering and neighboring sample filtering.
Figure 1B:
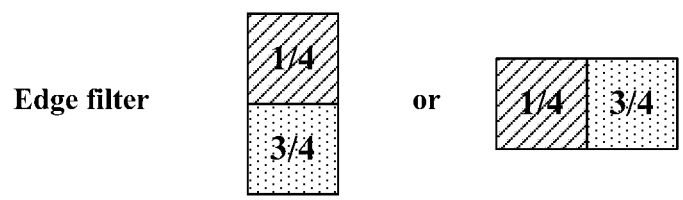
FIG. 1B-FIG. 1C illustrate examples of boundary filtering for edge boundary pixels and corner boundary pixels respectively for a block coded by DC Intra prediction mode according to the existing High Efficiency Video Coding (HEVC) standard.
Figure 1C:
Figure 2:
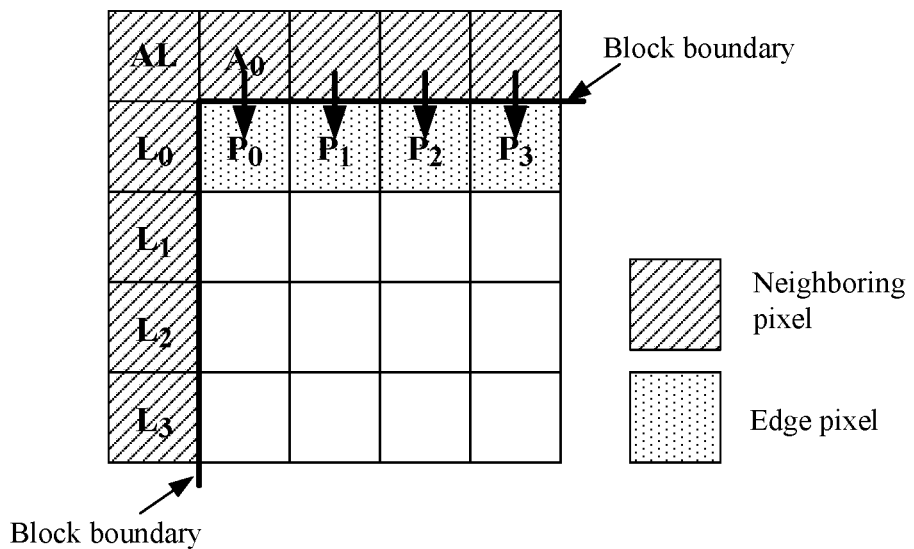
FIG. 2 illustrates an example of boundary filtering for boundary for a block coded by horizontal Intra prediction mode according to the existing High Efficiency Video Coding (HEVC) standard.
Figure 3A:
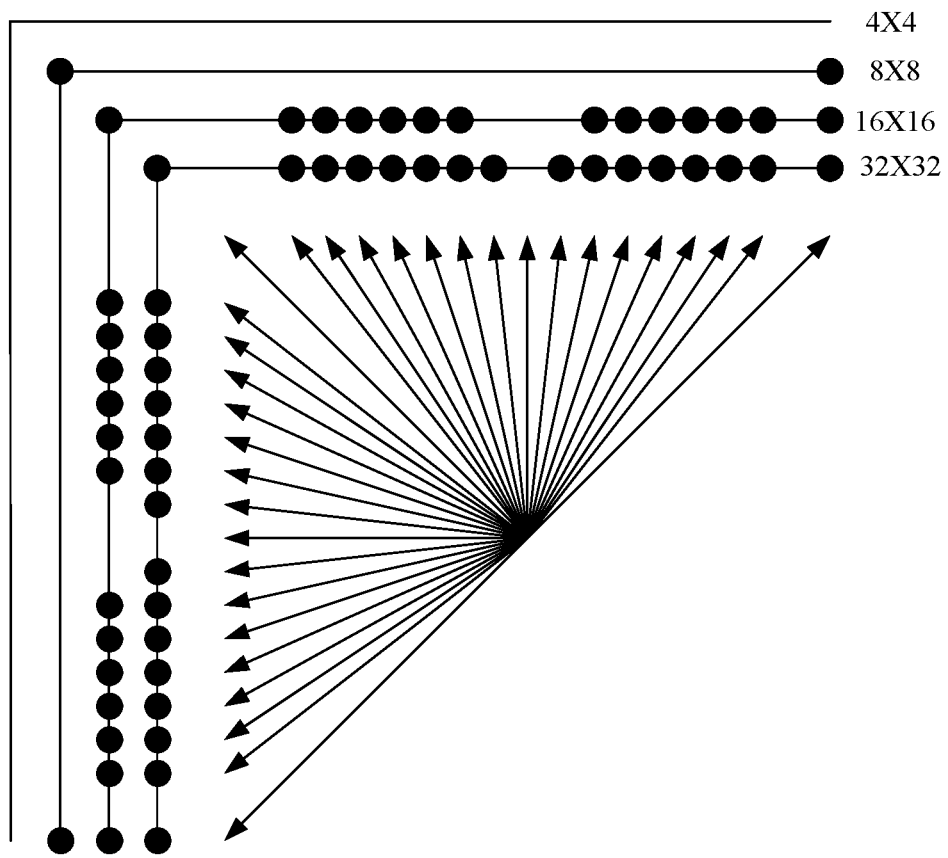
FIG. 3A illustrates an example of neighboring samples subject to neighboring sample filtering for various block sizes, where the blocks are coded in the Intra prediction mode according to the existing High Efficiency Video Coding (HEVC) standard.
Figures 3B, 4:
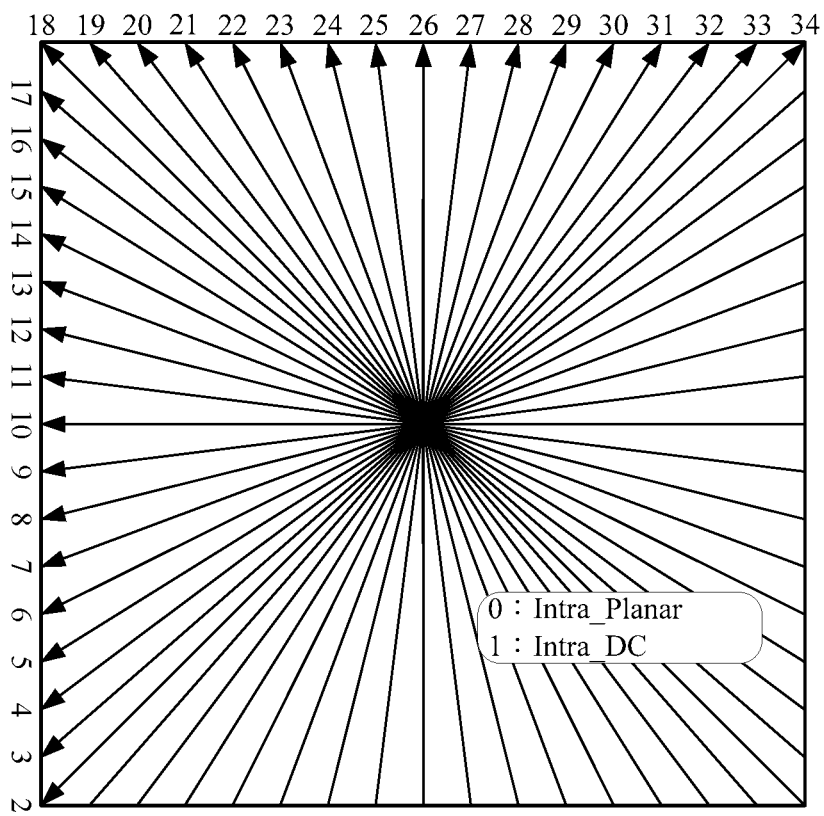
FIG. 3B illustrates an example of neighboring sample filtering process according to the existing High Efficient Video Coding (HEVC) standard.
FIG. 4 illustrates the directions and associated mode numbers for the Intra prediction modes of the existing High Efficiency Video Coding (HEVC) standard.

As mention above, the existing block boundary filtering described in the High Efficiency Video Coding (HEVC) standard is always applied for DC Intra prediction mode. Due to the fact that the depth video and screen content video materials may contain sharp transition in the contents. The use of block boundary filtering may degrade the image quality. Accordingly, the present invention provides control and syntax to adaptively determine whether to invoke block boundary filtering for the DC Intra prediction mode.

First Embodiment

In the first embodiment, boundary filtering for one or more modes selected from DC, vertical and horizontal Intra prediction modes can be disabled in depth coding but enabled in texture coding. For example, only the boundary filter for DC Intra mode is disabled in depth coding at sequence, picture, slice, block or CU level, but is enabled in texture coding. In another example, only the boundary filter for vertical and horizontal Intra prediction modes is disabled in depth coding at sequence, picture, slice, block or CU level, but is enabled in texture coding. In another example, the boundary filter for all of DC, vertical and horizontal Intra prediction modes is disabled in depth coding but is enabled in texture coding.

Second Embodiment

In the second embodiment, boundary filtering for one or more Intra modes selected from DC, vertical and horizontal Intra prediction modes can be disabled in dependent view texture coding at sequence, picture, slice, block or CU level and enabled in independent texture coding. For example, only the boundary filter for DC Intra mode is disabled in dependent view texture coding but is enabled in independent texture coding. In another example, only the boundary filter for vertical and horizontal Intra prediction modes is disabled in dependent view texture coding but is enabled in independent texture coding.

Third Embodiment

In third embodiment, boundary filtering for one or more Intra modes selected from DC, vertical and horizontal Intra prediction modes can be disabled in depth and dependent view texture coding at sequence, picture, slice, block or CU level and enabled in independent texture coding. For example, only the boundary filter for DC Intra mode is disabled in depth and dependent view texture coding but is enabled in independent texture coding. In other words, the boundary filtering for the selected Intra modes is enabled for the texture data in an independent view or a base view. In another example, only the boundary filter for vertical and horizontal Intra prediction modes is disabled in depth and dependent view texture coding but is enabled in independent texture coding.

Fourth Embodiment

In the fourth embodiment, boundary filtering for one or more Intra modes selected from DC, vertical and horizontal Intra prediction modes can be disabled in depth picture only when the size of CU is larger than (or equal to) a given threshold. For example, only the boundary filter for DC Intra mode is disabled in depth picture only when the size of CU is larger than (or equal to) a given threshold. In another example, only the boundary filter for vertical and horizontal Intra prediction modes is disabled in depth picture only when the size of CU is larger than (or equal to) a given threshold.

Fifth Embodiment

In the fifth embodiment, boundary filtering for one or more Intra modes selected from DC, vertical and horizontal Intra prediction modes is disabled in dependent view texture picture only when the size of CU is larger than (or equal to) a given threshold. For example, only the boundary filter for DC Intra mode is disabled in dependent view texture picture only when the size of CU is larger than (or equal to) a given threshold. In another example, only the boundary filter for vertical and horizontal Intra prediction modes is disabled in dependent view texture picture only when the size of CU is larger than (or equal to) a given threshold.

Sixth Embodiment

In the sixth embodiment, boundary filtering for one or more Intra modes selected from DC, vertical and horizontal Intra prediction modes is disabled in depth and dependent view texture picture only when the size of CU is larger than (or equal to) a given threshold. For example, only the boundary filter for DC Intra mode is disabled in depth and dependent view texture picture only when the size of CU is larger than (or equal to) a given threshold. In another example, only the boundary filter for vertical and horizontal Intra prediction modes is disabled in depth and dependent view texture picture only when the size of CU is larger than (or equal to) a given threshold.

Seventh Embodiment

In the seventh embodiment, boundary filtering for one or more Intra modes selected from DC, vertical and horizontal Intra prediction modes is disabled in CU which is coded in non-conventional HEVC intra prediction mode (e.g. depth map modeling mode in 3D-HEVC, intra prediction modes in screen-content coding standard, palette coding, and so forth) and enabled in CU which is coded in conventional HEVC intra prediction mode. For example, only the boundary filter for DC Intra mode is disabled in a CU which is not coded in conventional HEVC intra prediction mode and enabled in a CU which is coded in conventional HEVC intra prediction mode. In another example, only the boundary filter for vertical and horizontal Intra prediction modes is disabled in a CU which is not coded in conventional HEVC intra prediction mode and enabled in a CU which is coded in conventional HEVC intra prediction mode.

The adaptive block boundary filtering control disclosed above can also be extended to screen-content video coding as shown in the following examples.

Eighth Embodiment

In the eighth embodiment, boundary filtering for one or more Intra modes selected from DC, vertical and horizontal Intra prediction modes is disabled in screen-content sequence, picture, slice, block or CU coding and enabled in nature video coding. For example, only the boundary filter for DC Intra mode is disabled in screen-content sequence, picture, slice, block or CU coding but is enabled in nature video coding. In another example, only the boundary filter for vertical and horizontal Intra prediction modes is disabled in screen-content sequence, picture, slice, block or CU coding but is enabled in nature video coding. In another example, the boundary filter for all of DC, vertical and horizontal Intra prediction modes is disabled in screen-content coding but is enabled in nature video coding.

Ninth Embodiment

In the ninth embodiment, boundary filtering for one or more Intra modes selected from DC, vertical and horizontal Intra prediction modes is disabled in screen-content picture only when the size of CU is larger than (or equal to) a given threshold. For example, only the boundary filter for DC Intra mode is disabled in screen-content picture only when the size of CU is larger than (or equal to) a given threshold. In another example, only the boundary filter for vertical and horizontal Intra prediction modes is disabled in screen-content picture only when the size of CU is larger than (or equal to) a given threshold.

Tenth Embodiment

In the tenth embodiment, boundary filtering for one or more Intra modes selected from DC, vertical and horizontal Intra prediction modes is disabled in screen-content coding standard based on HEVC. For example, only the boundary filter for DC Intra mode is disabled in screen-content coding standard based on HEVC. In another example, only the boundary filter for vertical and horizontal Intra prediction modes is disabled in screen-content coding standard based on HEVC. In another example, the boundary filter for DC, vertical and horizontal Intra prediction modes is selectively disabled in screen-content coding standard based on HEVC.

Eleventh Embodiment

In the eleventh embodiment, boundary filtering for one or more Intra modes selected from DC, vertical and horizontal Intra prediction modes is disabled in screen-content coding standard based on HEVC only when the size of CU is larger than (or equal to) a given threshold. For example, only the boundary filter for DC Intra mode is disabled in screen-content coding standard based on HEVC only when the size of CU is larger than (or equal to) a given threshold. In another example, only the boundary filter for vertical and horizontal Intra prediction modes is disabled in screen-content coding standard based on HEVC only when the size of CU is larger than (or equal to) a given threshold.

Note that, in the above methods, when boundary filtering for one or more Intra modes selected from DC, vertical and horizontal Intra prediction modes are enabled, it implies that the same boundary filtering process of HEVC is also applied here.

The boundary filtering and neighboring sample filtering process for Intra prediction coded blocks according to the present invention can be divided into multiple steps, such as determining whether to disable boundary filtering/neighboring sample filtering, determining which filtering to disable (i.e., boundary filtering, neighboring sample filtering, interpolation or a combination), determining whether to disable filtering for a current Intra PU, and determining what Intra prediction modes that the filtering will be disable, finally carrying out the filtering disable operation by skipping or replacing the boundary filtering, neighboring sample filtering, interpolation or a combination.

In the first step, the filter-disabling selection determines whether to disable one or more filters among the boundary filter, neighboring sample filter (i.e., bi-liner filter and [1, 2, 1] filter) and interpolation filter. The selection can be based on a set of fixed rules for both encoder and decoder at sequence, view, layer, picture, slice, CTU (coding tree unit), CU (coding unit), or TU (transform unit) level. In this case, the decoder may implicitly derive the filter-disabling selection without the need for explicit signaling. For example, the selected filter can be disabled when the current block's CBF (coding bit flag) is 0, which signalizes there are no coding residuals for the current block. Alternatively, the filter-disabling selection can be signaled explicitly by the encoder in transmitted flags in the a transform unit (TU) level, prediction unit (PU) level, coding unit (CU) level, largest coding unit (LCU) level, coding tree unit (CTU) level, coding tree block (CTB) level, slice level, slice header, picture level, picture parameter set (PPS), sequence parameter set (SPS) or video parameter set (VPS).

After the filter-disabling selection is determined, a next level decision is made for each Intra predicted PU. A PU filter-disabling selection is determined regarding whether each of the selected filters should be disabled for the current PU. The decision can be made based on the properties of the current PU, such as the PU width, PU height, PU size, the neighboring reconstructed pixels, the prediction mode of the neighboring blocks, CU width or CU depth, whether the current CU is a transform-bypass CU, or whether the residual is decoded in the transform skip mode.

Then, for each current Intra prediction mode, Intra-mode filter-disabling selection is determined regarding whether each of the selected filters should be disabled for the current Intra mode. The decision can be made based on the properties of the current Intra mode, such as the prediction direction, whether the DC or Planar mode, or the values of the fetched neighboring pixels.

After the filtering decision determines to disable one or more the filters for the current Intra predicted PU with a current selected Intra prediction mode, the filter disabled will not be applied to the current PU with the current Intra prediction mode. When a selected filter is disabled, the video encoder or decoder may utilize a substitute operation to replace the disabled filtering operations. The substitute operation can be none. For example, if the interpolation filter is disabled, the substitute operation may set the predicted sample to the nearest sample of the pointed position at the Intra prediction direction.

While the above procedure illustrates one example of disabling boundary filter/neighboring sample filter/interpolation filter according to an embodiment, various procedures may be used to practice the present invention.

Table 3 and Table 4 illustrate an exemplary syntax design at the sequence level and the slice level according to one embodiment of the present invention. A flag intra_boundary_filter_pic_disable_flag is incorporated in the sequence parameter set (SPS) to indicate whether to disable boundary filtering for the corresponding sequence. If the flag is asserted (i.e., having a value of 1), the boundary filtering is disable for the pictures in the corresponding sequence. Otherwise, each slice may use its own flag intra_boundary_filter_slice_disable_flag to determine whether to disable the boundary filtering for video data in the slice.

TABLE 3

| | Descriptor |
|---|---|
| seq_parameter_set_rbsp( ) { | |
| ..... | |
|     intra_boundary_filter_pic_disable_flag | u(1) |
| ..... | |

TABLE 4

| | Descriptor |
|---|---|
| slice_segment_header( ) ( ) { | |
| ... | |
|     if(!intra_boundary_filter_pic_disable_flag) | |
|         intra_boundary_filter_slice_disable_flag | u(1) |
| ... | |

The flag or flags for indicating whether to disable or enable one or more filters related to boundary filtering, neighboring sample filtering or interpolation can be explicitly signaled in a transform unit (TU) level, prediction unit (PU) level, coding unit (CU) level, largest coding unit (LCU) level, coding tree unit (CTU) level, coding tree block (CTB) level, slice level, slice header, picture level, picture parameter set (PPS), sequence parameter set (SPS) or video parameter set (VPS). For example, a filtering-disable-flag associated with a high-level video data (e.g., SPS, VPS or PPS) can be used to indicate disabling at least one filter from a filter group. In addition, the filtering-disable-flag associated with a low-level video data corresponding to a current block level (e.g., a PU or CU) or a higher level (e.g., a CTU or a slice) than the current block level to disable at least one filter from a filter group for the low-level video data.

In another example, a significant map, significant table, or a set of significant flags can be transmitted at TU level, PU level, CU level, LCU level, CTU level, CTB level, slice level, picture level, slice header, PPS, SPS or VPS to indicate the selected filters that may be disabled. The boundary filtering/neighboring sample filtering/Interpolation control for Intra prediction coding as disclosed above can be applied to various video color components such as Y, U, V; R, G, B; Y, Cb, Cr, texture or depth.

Figure 5:
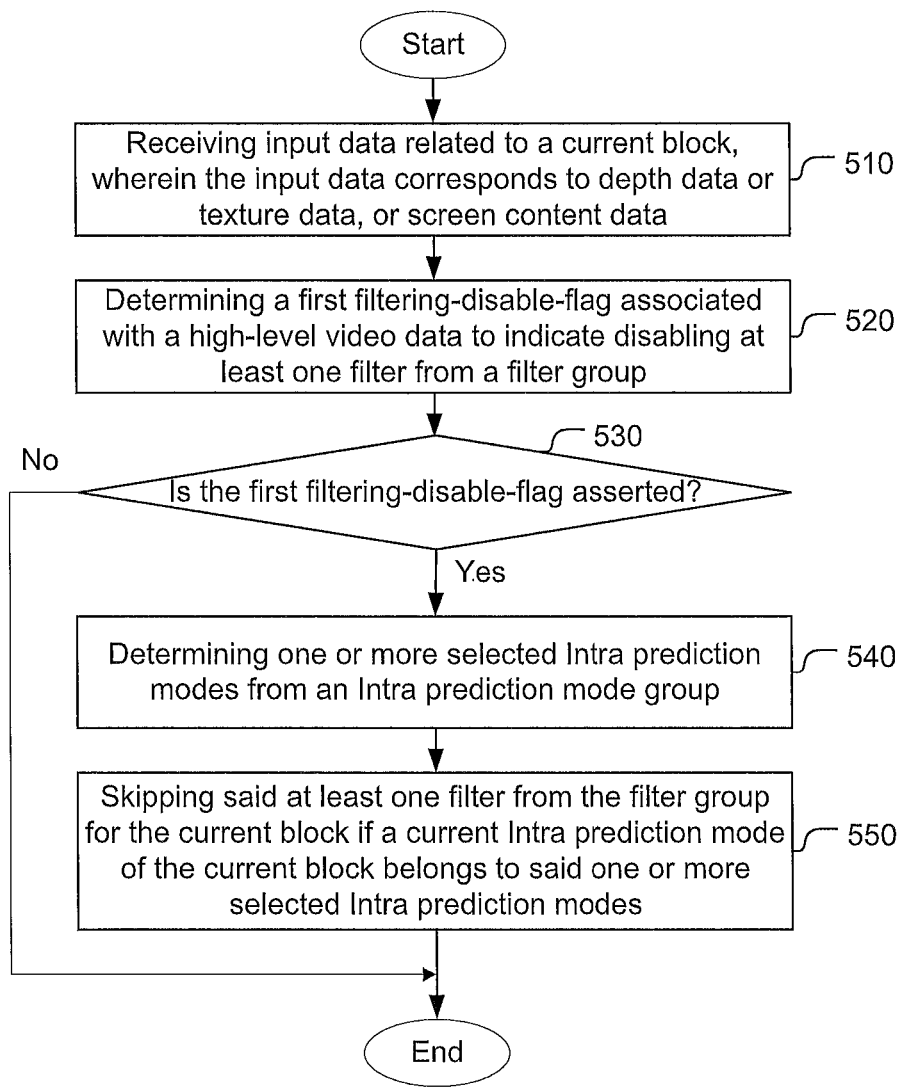
FIG. 5 illustrates an exemplary flowchart of a system using Intra prediction coding with boundary filtering control for selected Intra prediction modes according to an embodiment of the present invention.

FIG. 5 illustrates an exemplary flowchart of a system using Intra prediction coding with boundary filtering control for selected Intra prediction modes according to an embodiment of the present invention. Input data related to a current block is received in step 510, where the input data relates to depth data or texture data, or screen content data. The input data corresponds to pixel data, depth data of the current block to be coded at an encoder side or corresponds to coded pixel or depth of the current block to be decoded at the decoder side. The input data may be retrieved from memory (e.g., computer memory, buffer (RAM or DRAM) or other media) or from a processor. A first filtering-disable-flag associated with a high-level video data is determined to indicate whether to disable at least one filter from a filter group in step 520. A test is performed in step 530 regarding whether the first filtering-disable-flag is asserted (i.e., the "Yes" path). If the flag is asserted, steps 540 and 550 are performed. If the flag is not asserted (i.e., the "No" path), steps 540 and 550 are bypassed. In step 540, one or more selected Intra prediction modes from an Intra prediction mode group is determined. In step 550, said at least one filter from the filter group for the current block is skipped if the current Intra prediction mode of the current block belongs to said one or more selected Intra prediction modes.

The performance of a coding system incorporating an embodiment of the present invention is compared to that for an anchor system. The anchor system corresponds to the system without boundary filtering control (i.e., boundary filtering always On). The embodiment of the present invention includes the boundary filtering control flags in SPS and slice as shown in Table 3 and Table 4. The disable control is only applied to the DC Intra mode. The comparisons are performed under various coding configurations including All Intra (AI), Random Access (RA) and Low-delay B frame (LB). The comparison shows that the improvement in reduced bitrate is from 0.0% up to 1.2%.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of Intra prediction coding for multi-view video coding, three-dimensional video coding, or screen content video coding, the method comprising:
   receiving input data related to a current block, wherein the input data corresponds to depth data or screen content data;
   determining a first filtering-disable-flag associated with a high-level video data to indicate whether to disable at least one filter from a filter group, wherein the high-level video data corresponds to a level higher than a current block level, wherein each filter of the filter group relates to boundary filtering, neighboring sample filtering, interpolation filtering or a combination thereof, and wherein the at least one filter from the filter group includes an Intra Boundary Filter applied to boundary pixels of the current block using current reconstructed samples and neighboring reconstructed samples of the current block, and/or Neighboring Sample Filter applied to the neighboring reconstructed samples of the current block, wherein whether the Intra Boundary Filter is enabled or disabled is based on the first filtering-disable-flag, an implicit_rdpcm_enabled_flag, and a cu_transquant_bypass_flag such that:
  (i) when the first filtering-disable-flag is equal to 1, then the Intra Boundary Filter is set to be disabled;
  (ii) when the first filtering-disable-flag is equal to 0, the implicit_rdpcm_enabled_flag is equal to 1, and the cu_transquant_bypass_flag is equal to 1, then the Intra Boundary Filter is set to be disabled; and
  (iii) otherwise, the Intra Boundary Filter is set to be enabled, determining a second filtering-disable-flag associated with a low-level video data corresponding to the current block level or a higher level than the current block level to disable said at least one filter from a filter group for the low-level video data;

when the first filtering-disable-flag is enabled:

determining one or more selected Intra prediction modes from an Intra prediction mode group, wherein at least one of said one or more selected Intra prediction modes is selected from Horizontal prediction mode and Vertical prediction mode; and skipping said at least one filter from the filter group for the current block when a current Intra prediction mode of the current block belongs to said one or more selected Intra prediction modes based on the first-filtering-disable flag.

2. The method claim 1, wherein the high-level video data corresponds to a sequence level, a picture level, or a tile level, and the low-level video data corresponds to a slice level, a coding tree unit (CTU) level, a coding unit (CU) level or a prediction unit (PU) level or a transform unit (TU) level.

3. The method claim 1, wherein the second filtering-disable-flag is determined depending on a current block size.

4. The method claim 1, wherein the second filtering-disable-flag is signaled or parsed explicitly.

5. The method claim 1, wherein the second filtering-disable-flag is determined implicitly.

6. The method claim 5, wherein the second filtering-disable-flag is determined implicitly when there is no coding residual for the current block.

7. The method claim 1, further comprising applying said at least one filter from the filter group to the current block when the current Intra prediction mode does not belong to said one or more selected Intra prediction modes.

8. The method claim 1, wherein the current block corresponds to a prediction unit (PU) or a coding unit (CU).

9. The method claim 1, wherein said one or more selected Intra prediction modes from the Intra prediction mode group correspond to DC prediction mode, Horizontal prediction mode, vertical prediction mode, or any combination thereof.

10. The method claim 1, wherein determining the first filtering-disable-flag comprises determining that the first filtering-disable-flag is enabled when the input data corresponds to the depth data for multi-view video coding or three-dimensional video coding, or the screen content data for screen content video coding.

11. The method claim 1, wherein determining the first filtering-disable-flag comprises determining that the first filtering-disable-flag is disabled when the input data corresponds to texture data in an independent view or a base view.

12. The method claim 1, wherein filtering for DC prediction mode, Horizontal prediction mode, Vertical prediction mode, or a combination thereof is disabled when the input data is the depth data or the screen content data.

13. The method claim 1, wherein the first filtering-disable-flag is signaled or parsed explicitly.

14. The method claim 1, wherein the first filtering-disable-flag is determined implicitly.

15. The method claim 14, where in the first filtering-disable-flag is determined implicitly when there is no coding residual for the current block.

16. The method claim 1, wherein said at least one filter from the filter group is associated with a transform unit (TU) level, prediction unit (PU) level, coding unit (CU) level, largest coding unit (LCU) level, coding tree unit (CTU) level, coding tree block (CTB) level, slice level, slice header, picture level, picture parameter set (PPS), sequence parameter set (SPS) or video parameter set (VPS).

17. The method of claim 1, wherein when the current Intra prediction mode of the current block is DC prediction mode, horizontal prediction mode and/or vertical prediction mode, said at least one filter from the filter group for the current block is skipped.

18. The method of claim 1, wherein determining the first filtering-disable flag includes asserting the first filtering-disable-flag when the input data corresponds to the depth data for multi-view video coding or three-dimensional video coding, asserting the first filtering-disable-flag when the input data correspond to texture data in a dependent view in multi-view video coding or three-dimensional video coding, and dis-asserting the first filtering-disable-flag when the input data corresponds to the texture data in an independent view or a base view.

19. The method claim 18, wherein determining the first filtering-disable-flag comprises determining that the first filtering-disable-flag is enabled when the input data corresponds to the texture data in a view-dependent multi-view video coding or a view-dependent three-dimensional video coding.

20. An apparatus for Intra prediction coding for multi-view video coding, three-dimensional video coding, or screen content video coding, the apparatus comprising one or more electronic circuits configured to:

receive input data related to a current block, wherein the input data corresponds to depth data or screen content data;

determine a first filtering-disable-flag associated with a high-level video data to indicate whether to disable at least one filter from a filter group, wherein the high-level video data corresponds to a level higher than a current block level, wherein each filter of the filter group relates to boundary filtering, neighboring sample filtering, interpolation filtering or a combination thereof, and wherein the at least one filter from the filter group includes an Intra Boundary Filter applied to boundary pixels of the current block using current reconstructed samples and neighboring reconstructed samples of the current block, and/or Neighboring Sample Filter applied to the neighboring reconstructed samples of the current block, wherein whether the Intra Boundary Filter is enabled or disabled is based on the first filtering-disable-flag, an implicit_rdpcm_enabled_flag, and a cu_transquant_bypass_flag such that:
  (i) when the first filtering-disable-flag is equal to 1, then the Intra Boundary Filter is set to be disabled;
  (ii) when the first filtering-disable-flag is equal to 0, the implicit_rdpcm_enabled_flag is equal to 1, and the cu_transquant_bypass_flag is equal to 1, then the Intra Boundary Filter is set to be disable; and
  (iii) otherwise, the Intra Boundary Filter is set to be enabled, determine a second filtering-disable-flag associated with a low-level video data corresponding to the current block level or a higher level than the current block level to disable said at least one filter from a filter group for the low-level video data;

when the first filtering-disable-flag is enabled:

determine one or more selected Intra prediction modes from an Intra prediction mode group, wherein at least one of said one or more selected Intra prediction modes is selected from Horizontal prediction mode and Vertical prediction mode; and skip said at least one filter from the filter group for the current block when a current Intra prediction mode of the current block belongs to said one or more selected Intra prediction modes based on the first-filtering-disable flag.

* * * * *